United States Patent Office
3,061,439
Patented Oct. 30, 1962

3,061,439
STABILIZING OF MALT BEVERAGES
Irwin M. Stone, Eastchester, N.Y., assignor to Baxter Laboratories, Inc., New York, N.Y., a corporation of New York
No Drawing. Filed Jan. 2, 1957, Ser. No. 631,996
8 Claims. (Cl. 99—48)

This invention relates to the production of stable and chillproof malt beverages, to the improved malt beverages thereby produced, and to compositions for effecting this purpose.

In the consumption of a malt beverage such as beer or ale, the consumer looks for a sparklingly clear cool liquid and prefers those which have good flavor and satisfactory foam characteristics. Beer is currently packaged in glass bottles or cans and may be consumed a considerable time after leaving the brewery. It may also have traveled great distances from the brewery to the point of consumption.

After the package leaves the brewery there is little or no control over the conditions to which it is subjected, such as temperature, vibration and time of storage. All these conditions of time, temperature and travel have an adverse effect on the stability of the packaged malt beverage. Unless the packaged beverage is thoroughly chillproofed and stabilized by the brewer, the consumer will receive a beverage that may be hazy or cloudy in appearance and one which may have developed off-flavors. A beer that is not effectively chillproofed and stabilized may not be the same pleasant delectable beverage that it was when it left the brewery.

In order to chillproof and stabilize beers and ales several different means may be used. The method most universally practiced by the brewing industry is the use of proteolytic and other enzymatic materials. These enzymes digest and solubilize some of the protein substances in the malt beverage that tend to precipitate when the beverage is chilled. Some of this enzymatic activity survives pasteurization and the presence of these surviving active enzymes in the packaged beverage is desirable from the standpoint of maximum shelf-life and stability.

The presence of air in the package, or trace metals such as copper in the beverage, deleteriously affect the activity of these surviving enzymes and hence reduce the effectiveness of the protection against the deleterious action of time, temperature, and travel.

I have found that the addition to malt beverages of small amounts of certain homopolymers or copolymers of vinylpyrrolidone having the definite properties described below, produce an efficient chillproofing and stabilization without affecting any of the other properties of the beverage such as the flavor, color, or foam characteristics. This is especially true when these polymers or copolymers are used in conjunction with the enzymatic methods of stabilization. Beer produced by the use of these homopolymers or copolymers, either alone or in conjunction with the enzymatic method and in accordance with this invention possesses a stabilization superior to methods now used.

A method for clarifying and stabilizing malt beverages by the use of polyvinylpyrrolidone of a type similar to that used as a blood plasma extender has heretofore been proposed in U.S. Patent 2,688,550. Such a polymer has a molecular weight of the order of about 40,000 or higher. This produces a removable precipitate when added during the processing of the beer.

In the above patent a solution of the polyvinyl pyrrolidone (PVP) is added to the malt beverage during intermediate processing and in amounts within the range of ½ to 2 pounds per 100 barrels of beer. In this range of treatment a precipitate is formed with the tannin bodies present in the beer forming a complex PVP-protein-tannin precipitate. The precipitate flocculates and settles during the manufacturing process and is separated by filtration or other means. The beer thus clarified is stated to be chillproof and stable. The method of the patent depends upon the formation and removal of a PVP-protein-tannin complex precipitate as the means of effecting stabilization.

In a co-pending application, Serial No. 504,689, of Philip P. Gray, Irwin M. Stone and John E. Wiley, filed April 28, 1955, there is described a process for stabilizing beer in which high molecular weight homopolymers and copolymers of vinylpyrrolidone are used. In the method of this application, amounts of these high molecular weight polymers in excess of 2 pounds per 100 barrels are employed. It was found that with these larger amounts the precipitate, which forms at defined levels in the method of the patent, redissolves, thus making the filtration unnecessary and permits the retention of all the natural constituents of beer. An enhanced degree of stabilization results which is not attainable by the procedure of the patent.

Both of the above processes suffer from certain practical disadvantages. In the case of the method of the patent, it has been found that the precipitation of the PVP-protein-tannin complex is initially incomplete and further slow precipitation occurs which causes formation of objectionable hazes in the packaged beverage after standing. The process described in the cited application introduces the question of economics. In this method no precipitation or filtration is involved, but amounts in excess of 2 pounds per 100 barrels of the polymers are required to solubilize the precipitated complex. The additional cost of the additive must be considered.

I have found that low molecular weight, water-soluble, vinylpyrrolidone homopolymers, or copolymers of vinylpyrrolidone with other olefinic compounds, for example, vinyl acetate or vinyl alcohol, when added to malt beverages in small amounts produce no precipitation of the so-called protein-tannin complex such as is obtained when high molecular weight species of these polymers are employed. These low molecular weight polymers are very efficient chillproofing and stabilizing agents for malt beverages, and they avoid the drawbacks of undesirable continuing or latent precipitations which are inherent in the process of the patent. Furthermore, they offer additives that can be used at low levels, thus overcoming the economic disadvantages associated with the method of the cited patent application.

The molecular weight or degree of polymerization of polymers is usually expressed as a function of the viscosity of the material in solution. A commonly used value for this purpose is the K value of Fikentscher. However, the K values of the viscosity range in which these low molecular weight materials fall are not precise indications of their molecular weight. This is because the slope of the curve relating the viscosity to the K value is very steep in the region of low molecular weights and therefore may be inaccurate. For instance, I have found that polyvinylpyrrolidone having a K value of 30 with an estimated molecular weight of 40,000 is unsuitable for beer treatment in accordance with the present process at levels of about 1 pound per 100 barrels because it forms a haze and a continuing precipitation with the tannin-like bodies in the beer. A polyvinylpyrrolidone having a K value of 16 gave no undesirable precipitations either immediate or latent. Excellent stabilization was attained. The molecular weight of the polymer having a K of 16 was measured by a light scattering method and found to be 7800.

Difficulties are encountered in the determination of molecular weights by different methods for polymers of this type. Frequently the values obtained by different methods do not agree with one another.

A preferred criterion of the suitability of a polymer or copolymer for this process is that no permanent visual precipitation or haze shall develop on standing when such polymeric compounds or their solutions are added to a chilled malt beverage. A suitable test procedure is the following:

A 12-ounce clear glass bottle of commercial finished beer is cooled to about 0° C. At this temperature the beer should be perfectly clear. The cap is carefully removed from the bottle and a 2-ml. aliquot of a clear aqueous solution of the PVP polymer or copolymer is carefully added. The weight of polymer contained in this aliquot should be about 14 milligrams which is equivalent to a treatment of the beer at a level of 1.0 pound per 100 barrels. The bottle is resealed with a crown and then inverted repeatedly to mix in the polymer solution. No hazing or formation of a turbidity should appear in the beer either immediately after the addition of the polymer or after 24 hours further storage of the bottle at about 0° C.

Under these conditions, with the addition to beer of a PVP with a K=16 and an estimated molecular weight of 7,800, the beer will remain clear; with a PVP of K=30, having an estimated molecular weight of 40,000, the beer becomes hazy. With higher molecular weight PVP, such as K=60, molecular weight about 150,000 and above, the beer becomes turbid and after further cold storage of the bottle, a precipitate settles out.

The upper range of molecular size for vinylpyrrolidone polymers and copolymers suitable for use in this invention is in the neighborhood of polymers having K values of about 25 with molecular weights of approximately 30,000. It is difficult to establish an exact lower limit because of difficulties in the estimation of the constants of low molecular weight polymers but polyvinylpyrrolidones with estimated molecular weights of about 2,000 have found to stabilize beer when used according to the process herein described and, in general, the molecular weight should not be less than about 1,000. It should also be understood that the above stated molecular size ranges are only approximate because their determination involves many difficulties inherent in the experimental techniques used and in the possible lack of homogenity in the polymers. It is because of these difficulties that the above simple and practice hazing test is described to determine the suitability of vinylpyrrolidone polymers and copolymers for this invention.

The low molecular weight polymers and copolymers may be readily prepared from the monomers using methods known to those skilled in the art. The use of dilute solutions of the monomers during polymerization, or the use of large amounts of catalysts, or the fractional separation of low molecular weight components from a polymerized mixture are among the many methods which may be used in their preparation and are not a part of this invention.

For the treatment of beer or ale in a brewery, a concentrated solution of the polymer or copolymer is prepared either in water or in beer and added to the beer to be treated. The treatment is preferably applied after the beer has finished fermenting, and is done most conveniently when the beer is being moved from the fermenter to the storage tanks. The material may be added by means of a proportioning device which delivers measured quantities of the concentrated solution to the beer line as the tank is being filled. The concentrated solution may also be added through the open manhole of a tank containing a small amount of beer. After closing the manhole, the tank is filled and thorough mixing is obtained due to the force and currents produced by the beer entering the tank.

The amounts of low molecular weight polymer or copolymer to be used will depend somewhat on the characteristics of the beer, and the degree of stabilization desired. If used in conjunction with the enzymatic treatment, low levels, for example, of the order of 1.0 pound per 100 barrels may be used and the amount of enzyme employed may be reduced from that normally employed. Present commercial usage of the enzymatic method of chillproofing calls for the employment of commercially available enzyme preparations, these being commonly used at levels of between 1 pound and 2 pounds per 100 barrels. When the low molecular weight polymers or copolymers are used at the level of 1.0 pound per 100 barrels in conjunction with the enzyme at reduced levels of about 0.5 to 0.75 pound per 100 barrels an improved stabilization is obtained. The described combination produces results superior to the enzyme treatment alone. This improved effect of the combination of enzymes with polymer may in part be due to the strong protective action that the polymer exerts in preserving the activity of the enzymes in solution.

Moreover the type of stability obtained is characterized by increasing stability to high temperatures, for example, if bottles are stored at temperatures up to 50° C., and to high air content, with increasing proportions of the low molecular weight PVP. Stability under such conditions is almost impossible to secure for any prolonged period with enzyme treatment alone.

When these polymers are used without enzymes, an improvement in stability will result even at levels of 1 pound per 100 barrels although at this level a combination with enzymes is desirable for the most satisfactory results. In general, when polymers or copolymers are used alone, a level of 2 pounds shows enhanced beer stability as compared with the stability obtained at a level of 1 pound per 100 barrels. Further additions give further increases in stability and chillproofness and the upper limit is one of economics. Even at high levels such as 10 pounds per 100 barrels, there is no deleterious effect on the taste, foam, or other characteristics of beer.

*Example 1*

Twelve pounds of polyvinyl pyrrolidone of K=16 are dissolved in approximately one barrel (31 gallons) of water. When dissolved, this solution is placed in a tank equipped with a proportioning pumping device for adding solutions at a definite rate to a storage tank as it is being filled. Carbonated, storage beer after being filtered is run into a bottling tank and the polyvinyl pyrrolidone solution is proportioned into the tank as it is being filled at the rate of 2 pounds of the polyvinyl pyrrolidone per 100 barrels of beer. When the tank is full, the flow is stopped. The treated beer is then given a short rest period and then may be pumped over to the fillers for packaging. The packaged beer is then pasteurized in the usual manner.

*Example 2*

A solution is prepared in approximately one barrel of beer, of 6 pounds of polyvinyl pyrrolidone K=20 and 4.2 pounds of proteolytic chillproofing enzymes, such as "Collupulin." This solution is placed in the bottom of an empty storage tank. This can be easily done by transferring through the manhole of the tank a measured volume of the solution. The manhole is then closed and the tank is filled with beer. The volume of solution used is approximately 5 gallons per 100 barrels of beer, which is equivalent to about 1 pound of the polymer and 0.7 pound of the chillproof enzyme per 100 barrels. Fermented beer from which the yeast has settled out or storage beer from other storage tanks is pumped into this tank and filled. The turbulence of the incoming beer is depended upon to thoroughly mix the treatment with the beer. This beer is then cellared and processed in the usual manner customary with the particular brewery.

No change in the filtration, carbonation, packaging, or other procedures is required due to this treatment.

Example 3

To a 200-barrel storage tank there is added a solution of 3½ pounds of polyvinyl pyrrolidone of molecular weight 2,000 in 10 gallons of beer. Fermented beer from which the yeast has mostly settled is decanted and pumped into this tank from the fermenters. This beer is kept in cold storage for the customary aging period and is then filtered as usual to remove suspended yeast, carbonated if necessary, and given a final polish filtration. It is then packaged and pasteurized in the usual manner.

Example 4

Beer from the fermenter is pumped into a 300-barrel storage tank. During the pumping operations a solution of 2½ pounds of polyvinyl pyrrolidone, molecular weight 2,000, dissolved in approximately 6 to 7 gallons of water, is proportioned into the tank by means of a proportioning device while the tank is being filled. The beer in this tank is held under cold storage for the usual period and is then given a prefiltration to remove the suspended yeast. During the transfers involved in this filtration, a solution of 2.25 pounds of chillproofing enzyme, such as "Collupulin," dissolved in approximately 3 gallons of water, is proportioned into the lines. This prefiltered beer containing the polymer and the chillproofing enzyme is pumped into another storage tank and held under cold storage conditions for a period of several days to several weeks depending upon production schedules and brewery procedure. The beer is then given a final polish filtration, carbonated if necessary, and then packaged. The bottles or cans are then pasteurized in the usual manner.

Example 5

A mixture of 75% vinyl pyrrolidone and 25% vinyl acetate is polymerized to give a low molecular weight copolymer which, on addition to beer, does not produce any haze or precipitate in the test for suitability of the polymers given previously in this specification. Three pounds of the copolymer are dissolved in approximately 9 gallons of water and to this solution is added one pound of a commercial chillproofing enzyme, such as "Collupulin," and stirred to dissolve. This solution is added to an empty 200-barrel storage tank through the manhole. The manhole is closed and fermented beer decanted from a fermenting tank is pumped into the storage tank. The turbulence caused by the beer entering the tank is sufficient to uniformly mix the copolymer and enzyme with the beer. The beer is then further processed in the same manner as is customarily given any enzymatically chillproofed beer.

Example 6

A mixture of equal parts of vinyl pyrrolidone and vinyl acetate is polymerized. After polymerization, the acetate radical is hydrolyzed off to form the vinyl alcohol-vinyl pyrrolidone copolymer which when added to clear beer does not produce a haze or precipitate. The solution of the polymer is proportioned into the beer line in the ratio of 2 pounds of polymer to 100 barrels of beer, as the storage beer is given a prefiltration. This beer is then conducted into another storage tank and held under cold storage for a period of a few days to several weeks depending upon production demands. The beer is then given a final polish filtration, carbonated if necessary, and bottled off in the usual manner.

Example 7

Fermented beer, after completion of the fermentation and settling of the yeast crop, is decanted and pumped into a 400-barrel storage tank. While the beer is being pumped into this tank, a solution of 2½ pounds of a commercial chillproofing enzyme, such as "Collupulin," dissolved in approximately 5 gallons of beer, is proportioned in. The flow from the proportioning device is regulated so that the enzymatic chillproofing treatment is spread over the entire pumping period during the filling of the tank. This beer is then held under cold storage conditions for a period varying from a few days to several weeks, depending upon production conditions and is then given a prefiltration to remove unsettled yeast and any other suspended materials. The beer after passing through the filter is transferred to another storage tank during which a solution of 5½ pounds of a copolymer of vinyl pyrrolidone and vinyl alcohol in approximately ½ barrel of beer is proportioned in. The copolymer used in this example was polymerized from a mixture of 25% vinyl pyrrolidone and 75% vinyl acetate followed by hydrolysis of the acetate groups. The resulting copolymer responds to the test for suitability given earlier in these specifications in that no precipitation or haze is produced when a solution of the polymer is added to brilliant beer. The beer is then held under cold storage conditions until needed and further filtered, carbonated, and bottled as is customary for enzymatically chillproofed beer.

This application is a continuation-in-part of my application Serial No. 545,129, filed November 4, 1955, now abandoned.

I claim:

1. The process of stabilizing malt beverages which comprises adding to the fermented malt beverage a water-soluble polymer of vinylpyrrolidone having a molecular weight below the molecular weight at which a precipitate with the tannin bodies of the beverage forms.

2. Process for stabilizing malt beverages which comprises adding to the fermented malt beverage a water-soluble copolymer of vinylpyrrolidone and another olefinic compound having a molecular weight below the molecular weight at which a precipitate with the tannin bodies of the beverage forms.

3. Process of stabilizing malt beverages which comprises adding to the fermented malt beverage proteolytic chillproofing enzymes and a water-soluble polyvinylpyrrolidone having a molecular weight below the molecular weight at which a precipitate with the tannin bodies of the beverage forms.

4. Process of stabilizing malt beverages which comprises adding to the fermented malt beverage proteolytic enzymes and a water-soluble copolymer vinylpyrrolidone and another olefinic compound having a molecular weight below the molecular weight at which a precipitate with the tannin bodies of the beverage forms.

5. A stabilized malt beverage containing a water-soluble polymer of vinylpyrrolidone having a molecular weight below the molecular weight at which a precipitate with the tannin bodies of the beverage forms.

6. A stabilized malt beverage containing a water-soluble copolymer of vinylpyrrolidone with an olefinic compound having a molecular weight below the molecular weight at which a precipitate with the tannin bodies of the beverage forms.

7. A stabilized malt beverage containing proteolytic chillproofing enzymes and a water-soluble polymer of vinylpyrrolidone having a molecular weight below the molecular weight at which a precipitate with the tannin bodies of the beverage forms.

8. A stabilized malt beverage containing a proteolytic chillproofing enzyme and a water-soluble copolymer of vinylpyrrolidone and an olefinic compound having a molecular weight below the molecular weight at which a precipitate with the tannin bodies of the beverage forms.

References Cited in the file of this patent

UNITED STATES PATENTS

| | | |
|---|---|---|
| 2,433,411 | Wallerstein | Dec. 30, 1947 |
| 2,688,550 | McFarlane | Sept. 7, 1954 |
| 2,811,449 | Witwer et al. | Oct. 29, 1957 |